Oct. 25, 1966  P. COHEN  3,280,766
CUTTING TABLE EXTENSIONS
Filed May 13, 1965  2 Sheets-Sheet 1
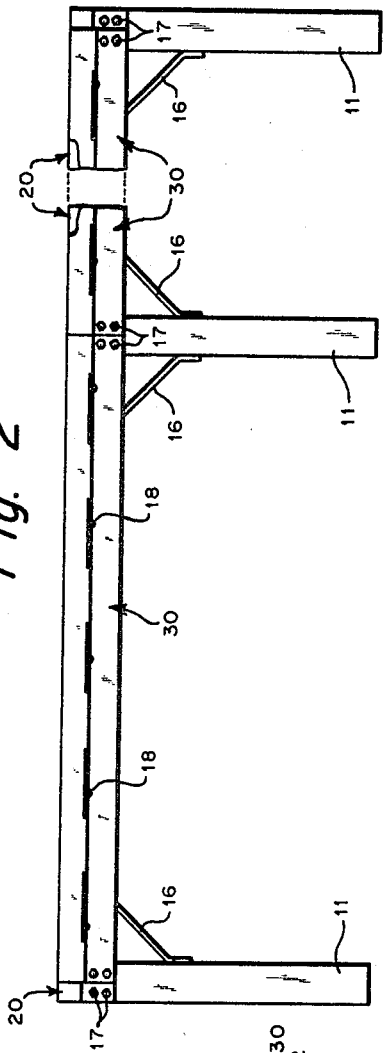
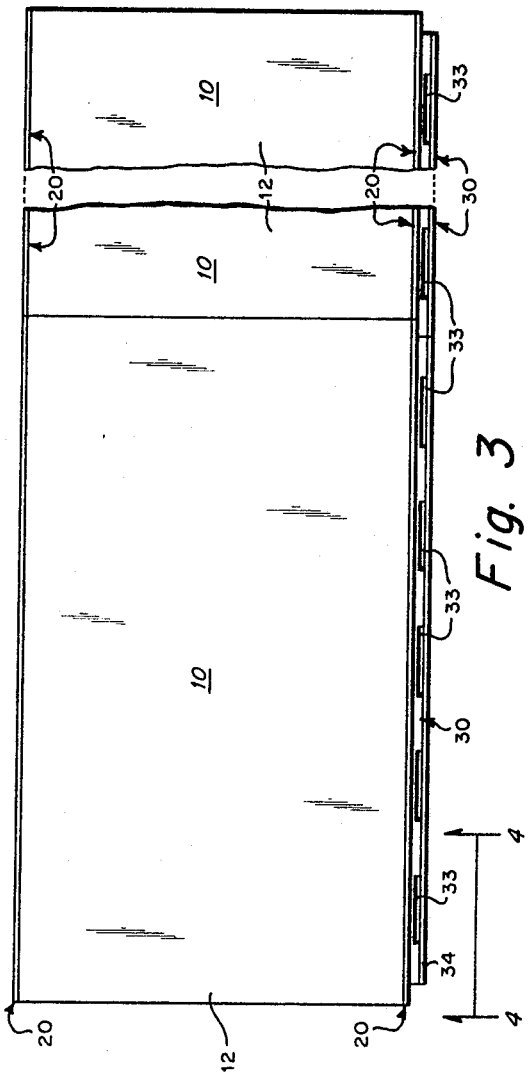
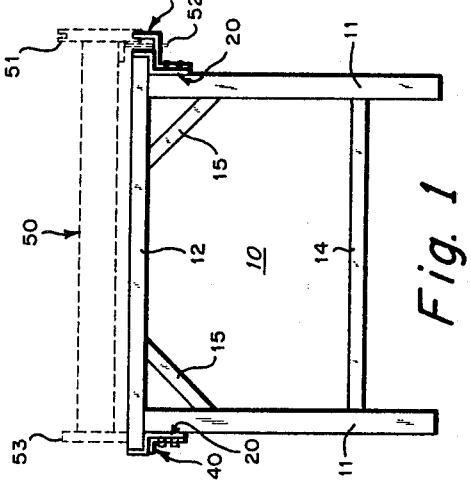
INVENTOR.
PHILIP COHEN
BY Paul Maleson
ATTORNEY INVENTOR.
PHILIP COHEN
BY Paul Malesm
ATTORNEY

United States Patent Office 3,280,766
Patented Oct. 25, 1966

3,280,766
CUTTING TABLE EXTENSIONS
Philip Cohen, 1201 Manoa Road, Philadelphia, Pa.
Filed May 13, 1965, Ser. No. 455,411
7 Claims. (Cl. 108—50)

This invention relates to attachments for tables. More particularly, it relates to extensions adapted to be applied to cutting tables.

In the manufacture of fabric products, a common step requires the use of sturdy elongated tables known as cutting tables. Cloth is commonly placed on such a table in a plurality of layers and the multilayered deck of fabric is cut to some predetermined pattern.

A preliminary step to this cutting is the deposit of the various layers of cloth. This function may be performed by what is known in the art as a spreader. A spreader is commonly a movable device carrying thereon a roll of cloth. It travels from one end of the cutting table to the other, depositing successive layers of fabric onto the surface of the table. This invention concerns certain attachments or extensions adapted to be applied to standard cutting tables so as to permit them to accommodate spreaders in an advantageous manner. The present invention is intended to permit the conversion of an ordinary cutting table in a simple and quick manner so that it may accommodate a spreader in a particularly advantageous way.

This invention relates to cutting tables.

This invention to extensions for cutting tables to adapt said cutting tables to carry a table-mounted spreader.

This invention relates to a spreader track adapted to be easily attached to a long side of a cutting table to provide partial support for a spreader and to provide for the control of travel of a spreader.

This invention also relates to an apron rail adapted to be easily attached to a long side of a cutting table to partially support a spreader.

Other aims and objects of this invention are made apparent in the following specification and claims.

The invention is best initially understood in connection with the accompanying drawings in which like reference numerals refer to like parts and in which:

FIGURE 1 is an end view of a cutting table equipped with an apron rail on one side and a spreader track on the other side;

FIGURE 2 is a side elevation, fragmented, of a cuting table taken from the right side of FIGURE 1;

FIGURE 3 is a plan view from above, partially fragmented, of the cutting table of FIGURE 1;

Figure 4:
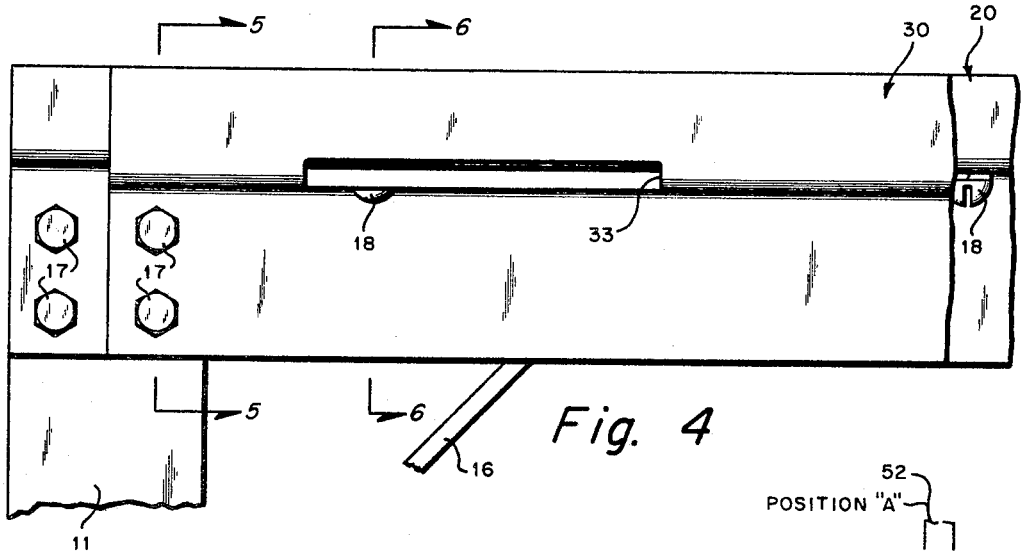
FIGURE 4 is an enlarged, partially fragmented, view of one end of the track mounted on the table, taken along line 4—4 of FIGURE 3.

A cutting table of the general type herein contemplated is shown for example in United States Patents 2,605,150, and 2,731,316, the present inventor being the inventor in both of these earlier patents. Cutting tables in use involve a plurality of table units placed in an end-to-end relationship to make a very long table with a continuous and unbroken surface except for the join line of the individual table units. For convenience, each of these end-to-end table units are herein referred to as a table section. Thus, FIGURE 3 shows two end-to-end abutting and joined table sections, each table section generally designated 10.

Each table section 10 is provided with a heavy, sturdy flat, table top 12. Table tops 12 are conveniently and preferably made of pressed composition board.

Each table section 10 is provided with a plurality of legs 11. As best shown in FIGURE 1, each pair of legs is provided with a leg cross brace 14. The leg cross brace 14 is affixed close to the bottom of a pair of legs and runs parallel to the short side of a cutting table section.

Each leg is equipped with a diagonal brace 15 which runs from the leg near its upper end, upwardly and inwardly. Each brace 15 is parallel to the short edge of the table section 10. Each leg 11 is also provided with a diagonal brace 16 which runs from near the upper end of leg 11 upwardly and parallel to the long side of table section 10.

The long edges of each table section 10 are provided with edging 20. The configuration of edging 20 may best be seen in FIGURES 1, 5, and 6. The edging 20 is elongated, running the length of the long edge of the table section 10. As shown in the drawings, the edging 20 comprises a short vertical section which covers and protects the edge of the table top 12, a horizontal section extending inwardly, and a lower vertical section depending downwardly from the inner edge of the horizontal section.

The horizontal section of the edging 20 is provided with a plurality of holes to accommodate a corresponding plurality of screws 18. Screws 18 are shown, for example, in FIGURES 2, 4, 5, and 6. These screws 18 serve to hold the edging 20 firmly against the table top 12, and it is seen that a split lock washer is preferably provided between the slotted head of each screw 18 and the underside of the horizontal section of edging 20.

The lower vertical section of each edging 20 is provided with pairs of holes near each end of the edging. As best shown in FIGURE 2, the length of each edging 20 corresponds to the distance between the mid-points of legs 11 along the long side of a table section. Thus, the pairs of holes near the ends of each edging are used to receive threaded bolts 17. Bolts 17 pass through the holes in the edging 20 and through corresponding registering holes in the legs 11. Each leg 11 is provided near its upper end with two pairs of holes, so that each pair registers with the pair of holes near the ends of two abutting edgings 20. When bolts 17 are placed through these registering holes and secured by nuts, it will be seen that the table sections 10 are held in their abutting relationship and also the legs 11 are secured to the table sections.

The foregoing describes a work table and, in particular, a cutting table, which is to be modified and adapted by the present invention.

A spreader is a relatively heavy machine of a known type which reciprocatingly travels the length of the joined table sections 10, depositing cloth as it goes. FIGURE 1 shows in phantom lines a schematic representation of a spreader 50. It is necessary to adequately support the spreader 50, guide it, and control the extent of its travel. To adapt a table so that these functions may be carried out, two attachments or extensions are provided. These attachments or extensions are such that the functions are served and the adaptation of the existing tables may be carried out with a minimum of time, expense, and reconstruction. One long side of each table section 10 is thus provided with an attachment or extension described as a spreader track and the other long side of each table section 10 is provided with an attachment or extension described as an apron rail. The spreader track is described first.

Figure 5:
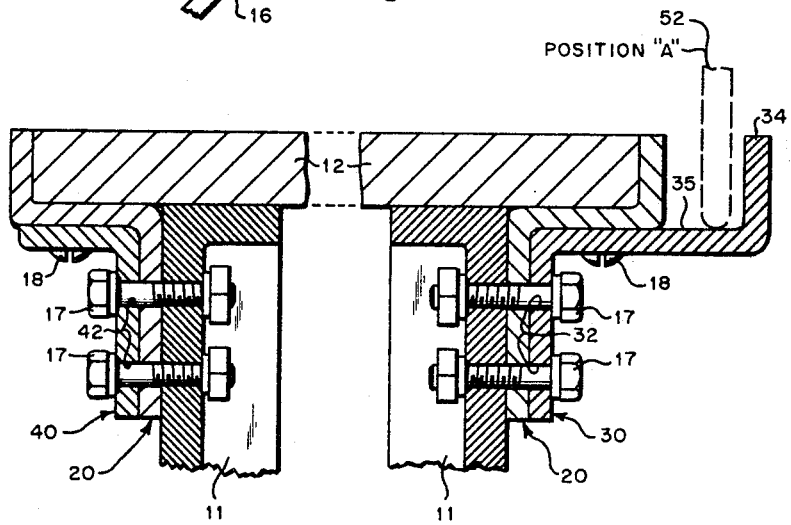
FIGURE 5 is a view partially in cross-section and partially fragmented, taken along line 5—5 of FIGURE 4, showing the spreader track at the right side thereof and the apron rail on the left side thereof.
Figure 6:
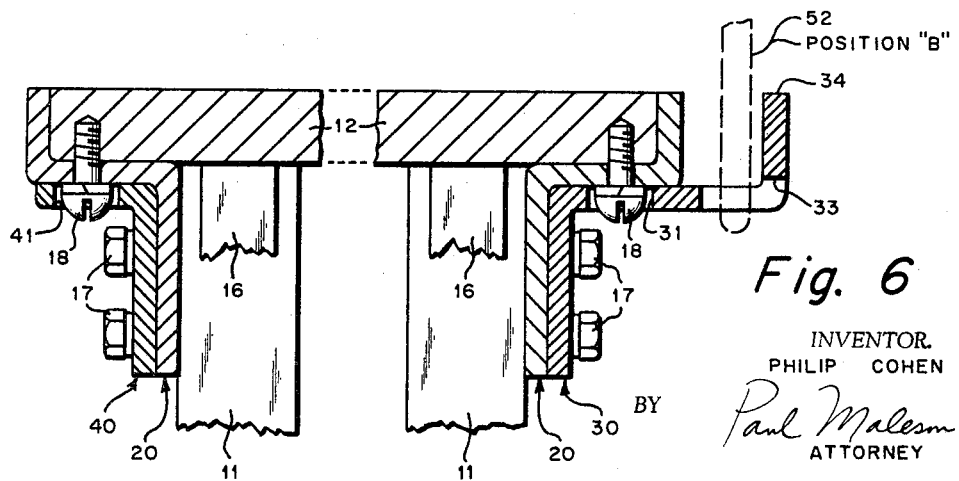
FIGURE 6 is a view, partially in cross-section, partially fragmented, taken along line 6—6 of FIGURE 4, showing the spreader track at the right side thereof and the apron rail at the left side thereof.

The spreader track is generally designated 30. Its structure and mounting on the table is best shown in FIGURES 1, 5, and 6. Each spreader track 30 is substantially the same length as the edging 20. It comprises a relatively short vertical section which is substantially parallel to the vertical section of edging 20, a horizontal section extending inwardly toward and under the table top 12, and a lower vertical section depending downwardly from the inner edge of the horizontal section. The general configuration of spreader track 30 is similar to that of edging 20 except that the horizontal section of spreader track 30 is longer. A pair of holes are provided near each end of each spreader track 30, adapted to receive the threaded bolts 17. The location and spacing of these holes in spreader track 30 is the same as has been described above in connection with the similar holes in edging 20. As best shown in FIGURE 5, the threaded bolts 17 pass through the registering corresponding holes in spreader track 30, edging 20, and leg 11.

The horizontal section of the spreader track 30 is provided with a plurality of holes, each of said holes corresponding with the location of one of the screws 18 which hold the edging to the table top, as has been described. As best shown in FIGURE 6, each of the holes in the horizontal section of spreader track 30 is oversized as compared to the corresponding hole in the edging 20, and is large enough to accommodate the slotted head of screw 18.

The horizontal section of spreader track 30 is also provided with a plurality of elongated slots 33. The location and number of these slots 33 are best shown in FIGURES 2 and 3. The detailed configuration of each slot 33 may be seen in FIGURES 4 and 6. The major width of each slot 33 lies in the horizontal portion of the spreader track 30, and a portion of the width extends into the vertical portion of the spreader track.

In its installed position on the table section, the spreader track 30 sits against the edging 20, with the lower vertical sections of edging 20 and spreader track 30 being against each other, and the horizontal section 35 of the spreader track 30 being against and under the horizontal section of the edging 20. The vertical section 34 of the spreader track 30 is spaced outwardly from the vertical section of the edging 20, and extends to substantially the same height, as best shown in FIGURE 5.

In providing the spreader track on the table, the threaded bolts 17 are removed from their original position in which they held only the edging 20 to the leg 11. The threaded bolts 17 are then reset through the spreader track, the edging, and the leg, and are fastened with nuts, as shown in FIGURE 5. Each vertical screw 18 has its head accommodated in the oversized hole in horizontal section 35 of the spreader track and, therefore, it is unnecessary to remove and reset these screws 18. Thus, the spreader track 30 is installed with great simplicity.

The structure of the apron rail 40 is described next. Apron rail 40 is an elongated element of substantially the same length as the edging 20. As best shown in FIGURE 1 and the left side of FIGURE 5, it is seen that the apron rail 40 is provided on one of the long sides of the table section 10. Each apron rail 40 has a horizontal section and a downwardly depending vertical section, thus, making an L-shaped configuration in cross-section. The vertical section of the apron rail 40 is provided with a pair of holes near each end thereof to receive the threaded bolts 17. In the same manner as has been described in connection with the spreader track 30, the holes in the vertical section of apron rail 40 are spaced to correspond to and register with the similar holes in edging 20 and in the table legs 11. The horizontal section of apron rail 40 is provided with a plurality of holes, a hole being provided for each screw 18. As best shown on the left side of FIGURE 6, these holes in the horizontal section 41, which may be described as screw-head receiving holes, are large enough to accommodate the slotted heads 18 of screws 18. This feature is similar to that of the screw-head receiving holes 31 in the horizontal section 35 of the spreader track 30.

The apron rail fits against the edging 20, as best shown in FIGURES 5 and 6. To provide the apron rail on the table section 10, the bolts 17 are removed, the apron rail is placed, as shown, and the bolts 17 are reset. The screws 18 do not have to be removed, as has been explained, because the holes 41 are large enough to accommodate the screw heads.

The elongated table, consisting of a plurality of table sections 10, is now adapted to accommodate the spreader 50. As shown in FIGURE 1, spreader 50 is supported on a roller 53 and a guide roller 51. The showing of the spreader and the rollers is schematic. The guide roller 51 is adapted to run on the top edge of the vertical section 34 of spreader track 30. Preferably, guide roller 51 has a slotted circumference so that it is properly held and aligned on vertical section 34. Roller 53 runs directly on table top 12, over apron rail 40. Thus, apron rail 40 and spreader track 30 serve the function of supporting the relatively additional weight imposed on table section 10 by the spreader 50. In addition, spreader track 30 provides a guide function to properly align the spreader in its reciprocating motion. The remaining function of the spreader track relates to the elongated slots 30. The provision of the plurality of these elongated slots permits the provision of switch means whereby the motion of the spreader 50 may be stopped and reversed at any select point. Such switch means are generally known in the art as limit switches. Part of such a typical limit switch means is shown in phantom lines in FIGURES 1, 5, and 6. A switch lever 52 depends downwardly from spreader 50. In position A, lever 52 rides on the upper surface of horizontal section 35 of spreader track 30. When the lever 52 reaches one of the slots 33, it can drop to position B, as shown in FIGURE 6, in which it extends through the slots. If lever 52 is conductive, it will touch a corresponding contact (not shown) which is positioned below slot 33 and, thus close a circuit to stop and/or reverse the direction of travel of the spreader 50.

Another embodiment of a limit switch means is one in which the lever 52 is not necessarily conductive, but simply travels in position A. Another lever (not shown) extends upwardly through the desired slot 33, and activates the switching means when struck by lever 52. It is apparent that the provision of the plurality of elongated slots 33 permits the provision of one or a plurality of contacts comprising part of the limit switch means, and that the limit of travel of spreader 50 may be freely chosen and may be easily varied.

The horizontal sections of the apron rail and the spreader track may be described, for ease of reference, as having a pair of long edges. The long edges are those which are shown for example in FIGURES 2 and 3, and run with the long side of the cutting table. The outermost portion 34 of the spreader track 30, as shown in FIGURE 5, for example, may be described as an upper vertical section which depends upwardly from one long edge of the horizontal section. A lower vertical section which is provided with bolt holes 32, is described as a lower vertical section dpending downwardly from the other long edge of the horizontal section. The same general terminology is applied to the apron rail 40, in which the bolt holes 42 are provided in the lower vertical section which depends downwardly from one long edge of the horizontal section.

The edging 20, the apron rail 40, and the spreader track 30, are all preferably made of heavy gauge steel. Preferably, the apron rail is an integral unit and the spreader track is also an integral unit.

I claim:

1. A spreader track to adapt a cutting table to accommodate a spreader, comprising an elongated horizontal section having an opposed pair of long edges, an upper vertical section depending upwardly from one said long edge, and a lower vertical section depending downwardly from the other said long edge, said lower vertical section being provided at each end thereof with a pair of holes to receive bolts, and said horizontal section being provided with a plurality of holes spaced therealong near said lower vertical section, said holes having a diameter large enough to receive screw-heads, said horizontal section including a plurality of elongated slots spaced therealong near said upper vertical section.

2. An apron rail to adapt a cutting table to accommodate a spreader, comprising an elongated horizontal section having an opposed pair of long edges, a vertical section depending downwardly from one said long edge, said other long edge having no dependent section attached thereto, said vertical section being provided at each end thereof with a pair of holes to receive bolts, and said horizontal section being provided with a plurality of holes spaced therealong, said holes having a diameter large enough to receive screw-heads.

3. The combination of a cutting table having an opposed pair of long sides and extensions on each of said long sides to adapt said cutting table to accommodate a spreader, said extension on one of said long sides being a spreader track, said spreader track comprising an elongated horizontal section having an opposed pair of long edges, an upper vertical section depending upwardly from one said long edge, and a lower vertical section depending downwardly from the other said long edge, said lower vertical section being provided at each end thereof with a pair of holes to receive bolts, bolts through said bolt holes to connect said spreader track to said table, and said horizontal section being provided with a plurality of holes spaced therealong near said vertical section, said holes having a diameter large enough to receive screwheads, said horizontal section including a plurality of elongated slots spaced therealong near said upper vertical section.

4. A combination as set forth in claim 3, wherein said other long side of said cutting table is provided with an apron rail, said apron rail comprising an elongated horizontal section having an opposed pair of long elges, a vertical section depending downwardly from one said long edge, said other long edge having no depending section attached thereto, said vertical section being provided at each end thereof with a pair of holes to receive bolts, bolts through said bolt holes to connect said apron rail to said table, and said horizontal section being provided with a plurality of holes spaced therealong, said holes having a diameter large enough to receive screw-heads.

5. A combination as set forth in claim 4, wherein each of said long sides of said cutting table is provided with an elongated edging, said edging being secured to said table by a plurality of screws having screw-heads, and each edging being provided at each end thereof with a pair of bolt holes, the said bolts through said spreader track bolt holes and said apron rail bolt holes passing through said edging bolt holes, and said screw-heads being received in said holes in said horizontal sections of said spreader track and said apron rail.

6. A combination as set forth in claim 5, wherein a spreader is provided on said table, said spreader having a roller at each side thereof, one said roller running on said table over said apron rail, and the other said roller running on said upper vertical section of said spreader track.

7. A combination as set forth in claim 6, wherein said spreader includes a limit switch means, and a part of said limit switch means extends through one of said elongated slots in said spreader track.

References Cited by the Examiner
UNITED STATES PATENTS

| | | | |
|---|---|---|---|
| 794,809 | 7/1905 | Marsh | 108—143 |
| 1,359,479 | 11/1920 | Angle | 108—50 |
| 1,855,273 | 4/1932 | Adams | 108—50 |
| 2,284,917 | 6/1942 | Nelson | 108—143 |
| 2,605,150 | 7/1952 | Cohen | 108—69 |
| 2,731,316 | 1/1956 | Cohen | 108—158 |
| 3,068,609 | 12/1962 | Gallo | 108—50 |

FRANK B. SHERRY, *Primary Examiner.*

G. O. FINCH, *Assistant Examiner.*